United States Patent [19]

Kim et al.

[11] Patent Number: 4,956,396

[45] Date of Patent: Sep. 11, 1990

[54] PROCESS FOR PREPARING RIGID POLYVINYL CHLORIDE STRACTURED FOAMS HAVING SUPERIOR SURFACE CHARACTERISTICS

[75] Inventors: Kwang-Ung Kim; Byoung-Chul Kim; Soon-Man Hong, all of Seoul, Rep. of Korea

[73] Assignee: Korea Advanced Institute of Science & Technology, Seoul, Rep. of Korea

[21] Appl. No.: 319,628

[22] Filed: Mar. 6, 1989

Related U.S. Application Data

[62] Division of Ser. No. 277,894, Nov. 30, 1988, Pat. No. 4,886,837.

[30] Foreign Application Priority Data

Dec. 9, 1987 [KR] Rep. of Korea ............... 14012

[51] Int. Cl.$^5$ ............................................. C08J 9/06
[52] U.S. Cl. ........................................ 521/85; 264/54; 521/79; 521/81; 521/92; 521/97; 521/139; 521/145
[58] Field of Search ............... 521/145, 85, 79, 81, 521/92, 97, 139; 264/54

[56] References Cited

U.S. PATENT DOCUMENTS

| | | | |
|---|---|---|---|
| 4,042,556 | 8/1977 | Yoshinaga | 521/145 |
| 4,427,795 | 1/1984 | Dorrestijn et al. | 521/145 |
| 4,563,482 | 1/1986 | Tanizawa et al. | 521/145 |

*Primary Examiner*—Morton Foelak
*Attorney, Agent, or Firm*—Brumbaugh, Graves, Donohue & Raymond

[57] ABSTRACT

A new rigid polyvinyl chloride foam is provided which has been improved with respect to the thickness of its non-foamed layer and the surface properties including its tensile strength and compressive strength. The foam can be produced preferably by mixing 3–10 parts per hundred of resin (per hundred resin) of dioctyl phthalate and 4–20 phr of an impact-resistance modifier such as a methyl methacrylate acid-butadiene-styrene copolymer with a composition of 100 phr of vinyl chloride resin, 5 phr of a processing aid, 2 phr of a heat stabilizer, 0.5 phr of a lubricant, 0.75 phr of a foaming agent and 0.75 phr of boric acid, and then extruding the resulting mixture from a single-screw extruder.

11 Claims, No Drawings

PROCESS FOR PREPARING RIGID POLYVINYL CHLORIDE STRACTURED FOAMS HAVING SUPERIOR SURFACE CHARACTERISTICS

This application is a division of application Ser. No. 07/277,894, filed on Nov. 30, 1988, now U.S. Pat. No. 4,886,837.

BACKGROUND OF THE INVENTION

1. Field of The Invention

The present invention relates to a process for fabricating a non-foamed surface layer on foamed polyvinyl chloride products by a simple extrusion of polyvinyl chloride resins using a foam-compounding method to which an anti-plasticization phenomenon applies without the modification of conventional single-screw extruders. Foam-structured materials of polyvinyl chloride resins have commercially become the subject of interest ascribable to the superior physical properties thereof.

2. Description of The Prior Art

Various techniques for rigid polyvinyl chloride foam products have been proposed in the prior art such as U.S. Pat. No. 3,706,679, and European Patent Nos. 0,037,308, 0,039,117 and 0,039,118. Nevertheless, most of those prior art techniques were concerned with the preparation of rigid polyvinyl chloride foams having a thickness of less than 0.2 mm. Physical properties of the commercially available rigid polyvinyl chloride foam products are suitable for use in various purposes, but the products should still be improved with respect to their surface characteristics such as brightness, scratch resistance, etc. These drawbacks are deemed to be ascribable to the thin thickness of the non-foamed layer.

The methods for the preparation of the rigid polyvinyl chloride foam products having a thick non-foamed layer are disclosed in U.S. Pat. Nos. 3,764,642 and 3,825,637. However, the former requires a modified extruder which must be equipped with a torpedo and the latter must employ an injection molding of foam cored sandwich structure method; both resulting in an increase of the production costs.

SUMMARY OF THE INVENTION

The object of the invention is to provide a process for preparing rigid polyvinyl chloride structured foams having superior surface characteristics.

These and other objects are attained by simply extruding a composition of polyvinyl chloride resin and a lower molecular weight, polar plasticizer which is formulated to cause an anti-plasticization by a conventional single-screw extruder.

Generally, when extruding a system composed of multicomponents, compound with lower viscosity flows towards the surface of the mold used. Thus, the addition of a small amount of a lower molecular weight, polar plasticizer to a rigid polyvinyl chloride composition, a part of the composition flows towards the surface of the mold and this results in an anti-plasticization phenomenon by which the high molecular weight chains can be arranged more regularly and more closely. Further, the addition of a lower molecular weight plasticizer to a rigid polyvinyl chloride composition may cause the elasticity of the molten mass to be considerably lowered so as to reduce the initial growth rate of bubbles Therefore, the non-formed surface layer can easily be formed by efficiently chilling the molten mass in a sizing die just after being extruded. By employing this anti-plasticization phenomenon, it is possible to prepare rigid polyvinyl chloride foams, which have a relatively thick non-foamed layer (e.g. up to a 1.5 mm thickness and which have been improved considerably in brightness, hardness and scratch resistance.

The amounts of the plasticizer to be added may be within the range of 3 to 10 phr (per hundred resin). Such plasticizers include phthalates, sebacates and adipates. Among these plasticizers, dioctylphthalate may preferably be used for its easy availability. Particularly, when these lower molecular weight, polar plasticizers are used together with small amount of impact-resistance modifiers, it is possible to obtain a rigid polyvinyl chloride foam product which has a thicker thickness (up to 3 mm), a superior brightness and scratch resistance and a good impact resistance. Such impact-resistance modifiers may include methyl methacrylate-butadiene-styrene copolymers, vinyl acetate-butadiene-styrene copolymers, etc. and used in the amount of 4–20 phr.

If the amounts of these additives to be added are less than the above-mentioned limits, it is difficult to form non-foamed surface layer and the surface characteristics thereof becomes inferior. On the other hand, the amounts are higher than the above-mentioned limits, the mechanical strength is notably reduced, and particularly, with polar plasticizer, the impact resistance is considerably reduced.

Upon subjecting the compositions thus obtained to foaming, the thickness of the non-foamed layer changes depending on the decomposition manner of the foaming agent used as well as the physical properties of the gas produced when the foaming agent is decomposed. Those such as sodium bicarbonate which is slowly decomposed and the gas produced from which is slightly soluble in polyvinyl chloride can form a thicker non-foamed layer than azodicarbonamide which is rapidly decomposed and the gas produced from which is hardly soluble in polyvinyl chloride.

The most important foam may be obtained by mixing a composition of polyvinyl chloride (100 phr), sodium bicarbonate (0.75 phr), boric acid (0.75 phr), a heat stabilizer (2 phr), a lubricant (0.5 phr), a processing aid (5 phr), dioctyl phthalate (4 phr) and a methyl methacrylate-butadiene-styrene copolymer (5 phr) in a supermixer at 2000 rpm for 30 min and then extruding the composition at 120–150° C. This foam has shown the considerably improved surface characteristics such as brightness, scratch resistance, impact resistance, etc.

With the above composition, it is possible to control the thickness of the non-foamed layer in the range of 0.2 to 3 mm using a single-screw extruder by changing the conditions of foaming-extrusion, such as foaming-extrusion temperature and rate. In this case, if the thickness of the non-foamed layer is above 1.2 mm, its hardness and scratch resistance are considerably improved. In an extruded specimen of a rectangular cross section, when the thickness ratio of the non-foamed layer to the total thickness of the specimen is above 0.1, a 2–3 folds of mechanical strength of the specimen can be achieved at the same density.

In another aspect of the present invention, it is possible to prepare a small size of product composed of a rigid polyvinyl chloride structured foam.

Table 1 below shows a comparison of the properties of the foams from a composition of common rigid polyvinyl chloride with those from a composition of the rigid polyvinyl chloride according to the invention.

TABLE 1

Comparison of Properties of Rigid PVC Foams

| Composition*1 | Surface Property*2 | | Mechanical Performance*3 | | |
|---|---|---|---|---|---|
| | Thickness of Non-foamed Layer | Appearance (Brightness) | Tensile Strength | Compressive Strength | Scratch Resistance |
| F-1 | Below 0.2 mm | Inferior | 100 | 100 | Inferior |
| F-2 | 0.2–1.5 mm | Good | 150–200 | 180–220 | Good |
| F-3 | Below 0.4 mm | Usual | 80–110 | 100–120 | Usual |
| F-4 | 0.2–3 mm | Superior | 150–300 | 200–300 | Superior |

*1 The composition is exemplified in greater detail below.
F-1 is a conventional composition for a rigid PVC foam and is composed of the following ingredients:

| Ingredient | phr |
|---|---|
| Vinyl chloride resin (DP = 800 ± 50) | 100 |
| TM700R (Songwon Ind.) | 2 |
| Paraloid K-125 (Rohm and Haas Co.) | 5 |
| Boric acid | 0.75 |
| Stearic acid | 0.5 |
| Sodium bicarbonate | 0.75 |

F-2 is prepared by adding 4 phr of dioctyl phthalate to F-1.
F-3 is prepared by adding 8 phr of dioctyl phthalate to F-1.
F-4 is prepared by adding 4 phr of dioctyl phthalate and 5 phr of a methyl methacrylate-butadiene-styrene copolymer to F-1.

*2 The thickness of the non-foamed layer in the surface property changes depending on the processing conditions and the data given in the table shows the ranges of the thicknesses obtainable under a variety of the processing conditions.

*3 With respect to the mechanical performance, that of the foam from F-1 is set up 100 as a standard. In the case of the foams in rectangular form having the same density, the mechanical performance is increased with the increase of the ratio of the thickness of the non-foamed layer to the total thickness of a specimen.

DESCRIPTION OF THE PREFERRED EMBODIMENTS

The present invention will be described in greater detail by way of the following non-limiting examples.

Example 1

The following foaming composition of a rigid polyvinyl chloride (F-1) was admixed in a supermixer at 2,000 rpm.

| Ingredient | phr |
|---|---|
| Vinyl chloride resin (DP = 800 ± 50) | 100 |
| Paraloid K-125 (Processing aid; Rohm and Haas Co.) | 5 |
| TM700R (Heat stabilizer; Songwon Ind.) | 2 |
| Stearic acid (Lubricant) | 0.5 |
| Sodium bicarbonate (foaming agent) | 0.75 |
| Boric acid (nucleating agent) | 0.75 |

When the above composition (F-1) became in the form of freeflowing powder, the mixture was extruded to effect foaming thereof using a single-screw extruder (30 mm in diameter; length/diameter=24) to which a cylindrical die (8 mm in diameter; length/diameter=3.75) is attached at the following temperature ranges:

Hopper zone 120° C.
Heating zone 1: 140° C.
Heating zone 2: 145° C.
Heating zone 3: 150° C.
Die zone 120° C.

The extrusion at 15 rpm caused the formation of a foam with a density of 0.492 g/cm³. The thickness of its non-foamed layer was 0.07–0.1 mm. The tensile strength and the compressive strength of the layer were 86 kg/cm² and 125 kg/cm², respectively. Since the foam thus produced has a thin, non-foamed layer, its scratch resistance was inferior and its brightness was almost insensible.

Example 2

The procedures of Example 1 was repeated except that 4 phr of dioctyl phthalate were added to F-1 of Example 1. The temperature ranges at which the extrusion was effected were adjusted as follows:

Hopper zone 100° C.
Heating zone 1: 110° C.
Heating zone 2: 130° C.
Heating zone 3: 130° C.
Die zone 110° C.

A foam with a density of 0.624 g/cm³ and smooth surface was obtained. The thickness of the non-foamed layer was about 0.3–0.4 mm. The tensile strength and the compressive strength of the foam were 125 kg/cm² and 180 kg/cm², respectively. The surface brightness and scratch resistance of the foam were superior but the foam was slightly brittle.

Example 3

The procedure of Example 1 was repeated, except that 8 phr of dioctyl phthalate was added to F-1 of Example 1. The temperature ranges at which the extrusion was effected were adjusted as follows:

Hopper zone 100° C.
Heating zone 1: 110° C.
Heating zone 2: 135° C.
Heating zone 3: 150° C.
Die zone 125° C.

A foam with a density of 0.627 g/cm³ was obtained. The thickness of the non foamed layer was 0.05–0.09 mm. The surface of the foam was very inferior and the foam has a tensile strength of 111 kg/cm2 and a compressive strength of 160 kg/cm².

Example 4

The procedure of Example 1 was repeated except that 4 phr of dioctyl phthalate and 5 phr of a methyl methacrylate-butadiene-styrene copolymer were added to F-1 of Example 1. The temperature ranges at which the extrusion was effected were adjusted as follows.

Hopper zone 110° C.
Heating zone 1: 130° C.
Heating zone 2: 135° C.
Heating zone 3: 140° C.
Die zone 125° C.

A foam with a density of 0.835 g/cm³ was obtained. The foam has superior surface properties and mechanical performances. The non-foamed layer of the foam was of about 2 mm in thickness and had highly smooth and bright surface and superior scratch resistance. The tensile strength and the compressive strength of the foam were 315 kg/cm² and 465 kg/cm², respectively. Particularly, this foam also had superior impact resistance and nail-holding power, and sawed well.

As described above, it has become to possible to develop the structural materials of a rigid polyvinyl chloride foam which has superior properties such as inflammability, heat resistance, durability, and weather tolerance. Further, since it is possible to obtain a small size of rigid polyvinyl chloride foams, these foams may be used in the parts and accessories of electrical or electronic products; this might enhance additional values of the vinyl chloride resins.

In addition, the process developed by the invention may be applicable to the improvements in the foaming techniques of resins and in the properties of a variety of foams.

Although other kinds of plastic foams are also commercially available such as polyurethane foams, polystyrene foams, polyethylene foams and the like, development of the applicability of rigid PVC foams is highly expected in view of the prices and physiochemical properties thereof. In particular, rigid PVC foams are useful as substitutes for expensive woods owing to their easy coloring, durability and easy forming ability into the structure of complex cross sections by a simple extrusion process.

What is claimed is:

1. A process for producing a rigid polyvinyl chloride foam of a polyvinyl chloride resin which has a thick non-foamed layer and superior brightness, scratch resistance and impact resistance, which process comprises mixing 0.75 parts per hundred of resin of sodium bicarbonate as a chemical blowing agent and 0.5 parts per hundred of resin boric acid as a nucleating agent, 3–10 parts per hundred of resin of a polar plasticizer with a low molecular weight and 4–10 parts per hundred of resin of an impact resistance modifier with a raw polyvinyl chloride resin, and then extruding the mixture from a single-screw extruder to which a cylindrical die is attached.

2. The process as defined in claim 1, wherein the polar plasticizer is dioctyl phthalate and the modifier is a methyl methacrylate-butadiene-styrene copolymer.

3. The process as defined in claim 1, wherein the plasticizer is dioctyl phthalate.

4. The process as defined in claim 1, wherein the non-foamed layer has a thickness of 0.3–3.0 mm.

5. The process as defined in any one of claims 1 and 2 wherein the amount of the modifier is to be added is 5 parts per hundred of resin.

6. The process as defined is claim 1, wherein the extrusion is effected in a die at 110–150° C.

7. The process as defined in claim 6, wherein the extrusion is effected in a die at 110–125° C.

8. A polyvinyl chloride foam obtained according to any one claims 1 to 7.

9. The polyvinyl chloride foam as defined in claim 8, wherein the foam has a tensile strength of 80–350 kg/cm$^2$ and a compressive strength of 100–500 kg/cm$^2$.

10. The polyvinyl chloride foam as defined in claim 9, wherein the tensile strength is 111–315 kg/cm$^2$ and the compressive strength is 160–465 kg/cm$^2$.

11. The polyvinyl chloride foam as defined in any of claims 8 to 11, wherein the foam has a density of 0.62–0.94 g/cm$^3$.

* * * * *

UNITED STATES PATENT AND TRADEMARK OFFICE
CERTIFICATE OF CORRECTION

PATENT NO. : 4,956,396

DATED : September 11, 1990

INVENTOR(S) : Kim et al.

It is certified that error appears in the above-identified patent and that said Letters Patent is hereby corrected as shown below:

Title page, Item [54], "STRACTURED" should read --STRUCTURED--;

Column 1, line 56, "Thus," should read --Thus, with--;

Column 2, line 24, "the" (2nd occurrence) should read --if the --;

Column 4, line 63, "to possible" should read --possible--;

Column 4, line 66, "inflammability" should read --non-inflammability--;

Column 6, line 11, "modifier is" should read --modifier--;

Column 6, line 13, "defined is" should read --defined in--;

Column 6, line 18, "one" should read --one of--;

Column 6, line 27, "claims 8 to 11" should read --claims 8 to 10--.

Signed and Sealed this

Nineteenth Day of May, 1992

Attest:

DOUGLAS B. COMER

*Attesting Officer*   *Acting Commissioner of Patents and Trademarks*